United States Patent Office 3,598,789
Patented Aug. 10, 1971

3,598,789
FIBER-FORMING PACM-16
Emerson A. Tippetts, Wilmington, Del., assignor to E. I. du Pont de Nemours and Company, Wilmington, Del.
No Drawing. Filed Jan. 8, 1968, Ser. No. 696,105
Int. Cl. C08g 20/20
U.S. Cl. 260—78                          2 Claims

ABSTRACT OF THE DISCLOSURE

Linear polyamides of fiber-forming molecular weight that are useful for production of high recovery, wash-wear fabrics can be obtained from bi(4-aminocyclohexyl), bis(4-aminocyclohexyl)methane or 1,2 - bis(4-aminocyclohexyl)ethane and hexadecanedioic acid.

---

In accordance with the present invention, a linear fiber-forming polycarbonamide consisting essentially of repeating units of the formula

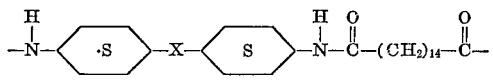

wherein X is selected from the group of a valence bond.

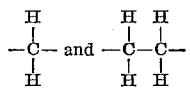

is prepared by the reaction of at least one diamine selected from bi(4-aminocyclohexyl), (abbreviated PAC herein), bis(4-aminocyclohexyl)methane and 1,2-bis(4-aminocyclohexyl)ethane (abbreviated PACE herein) or their amide forming derivatives and hexadecanedioic acid. Through the use of copolymerizable reactants as defined below, copolymeric units comprising divalent organic groups of from about 4 to 20 carbon atoms may be joined into the linear polymer chain by radicals from the class consisting of amino and carbonyl. Such copolymeric units may comprise up to 20 mol percent of the polymer. The preferred polyamide of the present invention is the reaction product of hexadecanedioic acid (16 acid) and bis(4-aminocyclohexyl) methane (abbreviated PACM herein) or their amide-forming derivatives. The diamine, due to its carbocyclic nature, is a mixture of isomers, having trans-trans (tt), cis-trans (ct) and cis-cis (cc) configurations. Hydrogenation conditions used in preparing the dialicyclic diamine result in a mixture of isomers, different conditions of hydrogenation producing different isomer distribution, as shown in U.S. 2,606,925, U.S. 2,494,563 and U.S. 2,606,924, for example.

By "fiber-forming" is meant that the polymer has a sufficiently high molecular weight to be in the fiber-forming range, i.e., an inherent viscosity of at least 0.6 (measured at 25° C. in a solution containing 0.5 gm. polymer in 100 gms. m-cresol. An equally useful solvent is a 1:1 mixture (wt. basis) of 98–100% formic acid and phenol.

TEST PROCEDURES FOR FIBER CHARACTERIZATION

The work recovery (WR) of a fiber subjected to stretching is useful in characterizing its resilience. Work recovery at 3% stretch is employed herein as representative of wrinkling stresses to which a fiber in a fabric is exposed. It is determined by conventional procedures as shown in the Du Pont "Technical Information Bulletin" X–142 issued September 1961. Wet work recovery is determined on a sample which has been soaked in water at room temperature for 30 minutes; the test is carried out while this sample is immersed in water.

Since modern synthetic fabrics are conventionally finished and heat set, measurements of fiber properties such as work recovery are made on fiber which has been boiled off in skeins at 4 mg./denier tension, dried, and has been subjected to a dry heat treatment of one minute at 180° C., permitting only 2% shrinkage. These conditions are considered "standard" herein, and give an adequate estimate of the response to be expected when fabrics are subjected to conventional heat setting treatment.

The following examples, in which percentages are by weight unless otherwise indicated, are intended to illustrate the invention. They are not intended to limit in any way.

EXAMPLE I

Purification of thapsic acid (hexadecanedioic acid)

Crude commercial thapsic acid (40.0 g.) having a melting point of 116–120° C., neutral equivalent (N.E.) 148, is dissolved in 500 ml. of ethyl alcohol containing 5 ml. concentrated sulfuric acid and the solution refluxed for 16 hours. The cooled reaction mixture is diluted with water and extracted with ether. The ether extract is dried over sodium sulfate. The ether is then removed and the residual liquid is distilled to give 36.0 g. of diethyl thapsate, B.P. 159° C. (0.5 mm.).

The mixture of 36.0 g. of diethyl thapsate, 200 ml. of ethylene glycol and 150 ml. of water containing 50 g. of potassium hydroxide is refluxed for 36 hours. The cooled solution is diluted with water and acidified with hydrochloric acid. The precipitated product is collected, dried in a vacuum oven at 80° C., and then recrystallized from dichloroethylene. The yield of product is 19.3 g., M.P. 125–126° C., N.E. 144.3 (reported M.P. 125° C., theoretical N.E. 143.1).

PACM–16 (70 tt) salt strike

A solution of 10.5 g. of 70 tt PACM diamine in 50 ml. of 2B alcohol is added to a warm, stirred solution of 14.2 g. of thapsic acid in 100 ml. of 2B alcohol. After adjusting the pH of the solution to 8.24, the solvent is evaporated; the residual salt dried in the oven at 60° C. gives a 23.0 g. yield.

PACM–16 (70 tt) polymerization and fiber production

PACM–16 (70 tt) salt (20.0 g.) is placed in a glass polymer tube with 0.04 ml. of 0.1 N acetic acid stabilizer. After flushing with nitrogen, the tube is sealed under vacuum. The sealed tube is heated 2 hours at 220° C. The tube is then opened and heated under one atmosphere of steam for 2 hours at 285° C. The crystalline polymer has an inherent viscosity of 1.0, and 66.5 equivalents of amine ends and 68.1 equivalents of carboxyl ends per million grams of polymer. The melting point (X-ray) is 290 to 300° C. The polymer is ground to flake, placed in a heated cylinder equipped with a piston and a spinneret, from which filaments are extruded at a temperature of 320° C. The yarn is drawn over a hot pin at 100° C. and a hot plate at 160° C., arranged in tandem. The fibers have a tenacity of 2.4 g.p.d., an elongation of 41%, and an initial modulus of 24 gm./den. The fibers are scoured and heat set, according to procedures specified above. They are then tested for work recovery, in comparison with PACM–10 filaments, with the results shown in the table.

TABLE 1

| Work recovery | Dry |
|---|---|
| Percent stretch | 3 |
| Polymer: | |
| PACM–16 (70 tt) | 86 |
| PACM–10 (70 tt) | 73 |

The PACM–10 filaments were prepared from PACM–10 (70 tt) polymer having an inherent viscosity of 0.96, and were drawn to produce a yarn having a break elongation of about 10% under the following conditions.

The filaments are drawn 3.7 times their extruded length over a snubbing pin (90° C.) and a hot plate at 180° C. The fiber was scoured and heat set before testing.

EXAMPLE II

The salt of bis(4-aminocyclohexyl)methane and hexadecanedioic acid is prepared by adding 178 g. of the 70% tt diamine in 870 ml. of Formula 2-B denatured alcohol to a stirred solution of 244 g. of the acid in 1800 ml. of the same solvent. The pH of the solution is adjusted to about 8.2. The precipitated salt is filtered off and a second crop of salt is obtained by concentrating the filtrate to about 1200 ml., cooling and adding an equal volume of isopropanol. The filtrate is then concentrated, cooled and a third crop of salt precipitated by addition of dioxane. The three crops of salt are dried at about 70° C. under vacuum and then combined and blended in a mortar. The yield of salt is 395 g.

Portions of this salt are placed in heavy walled glass polymer tubes. The tubes are flushed with nitrogen, evacuated, sealed, and heated for 2 hrs. at 250° C. The tubes are then opened and the solid from each tube transferred to a large test tube fitted with a stopper containing an inlet tube. The polymer is then heated in a steam atmosphere at 305° C. for 2 or 3 hrs. The polymers from the various tubes are then combined The inherent viscosity of the combined polymer is 1.18.

To 189 g. of the above salt is added 21 g. of the salt of bis(4-aminocyclohexyl)methane and isophthalic acid. The latter salt is prepared by adding a solution of 42.8 g. of 70% tt bis(4-aminocyclohexyl)methane in about 200 ml. of isopropanol to 33.2 g. of isophthalic acid in about 1500 ml. of isopropanol, filtering off the salt and drying at 70° C. under vacuum. The salts are thoroughly blended together and the mixture placed in glass polymer tubes. The tubes are heated at 280–300° C. for about 2 hrs. The tubes are then opened and the solid from each tube transferred to a larger test tube fitted with a stopper containing an inlet tube. The polymerization is then completed by heating this material in a steam atmosphere for 2 hrs. at 325° C. The combined polymer from these tubes has a inherent viscosity of 1.11. Based on the relative amounts of salts employed, the copolymer prepared in this manner contains about 10% by weight of the isophthalic polymer units. The above-prepared homopolymer and copolymer are melted separately and extruded from a spinneret blanketed with steam to form 34 filaments, 17 filaments from each of the polymers. The filaments are drawn 2.7× over a draw pin heated to 65° C. placed between the feed and draw rolls. A 3½-inch long H-shaped hot shoe at 140° C. lies between the draw roll and a separator roll. The yarn repeatedly contacts both sides of it, as it passes in multiple wraps around the draw roll and separator roll, thus annealing it at constant length. The denier of the final yarn is 130. When boiled in water the filaments of the polymer and of the copolymer shrink to a different degree. When the filaments are first woven into a fabric, which is then boiled off, a bulky fabric of pleasing hand is produced, due to the differential shrinkage of the filaments.

For the polyamides of this invention, increasing the tt isomer content of the diamine increases heat stability, improves tensile and recovery properties and reduces shrinkage. An increase in polymer viscosity improves tensile and recovery properties, although usually accompanied by an increase in shrinkage. Increased draw ratio has a similar effect. Increased annealing temperature (or time) increases structural stability and decreases shrinkage.

COPOLYMER COMPONENTS

In order to retain the superior recovery properties of the fibers of this invention, copolymer components generally should be kept to no more than about 20 mol percent. The introduction of such components into the polyamide chain disturbs the regularity of the repeat units in the chain, and prevents the chains from packing as closely together. The least disturbance of this regularity is produced when the copolymer component has an aliphatic structure very similar to that of the −16 acid. As an example, relatively large amounts of PACM–12 may be combined with PACM–16 as a copolymer; this type of copolymer introduces only a single new type of unit into the main chain, i.e., the −12 acid residue. Similarly, other copolymer components which include hexadecanedioic acid cause a relatively small disturbance of the polymer chain. Amino acids or the corresponding lactam (e.g., caprolactam) may also be used without much loss in recovery properties. The effect of copolymer components in reducing fiber recovery properties, described above, may be minimized to some extent (a) by introducing units which are structurally stiff, and (b) selecting such units as have approximately the same unit length as PACM (or PAC or PACE) or hexadecanedioic acid. Structurally stiff units are those which contain aromatic or cycloaliphatic rings. An intermediate combining the features of both (a) and (b) would be 2,2-bis(4-aminocyclohexyl)propane, for example.

Suitable diamines for copolymerizing with the dialicyclic diamines and −16 acid of this invention are diprimary or disecondary diamines, especially the alpha-omega aliphatic diamines of 2 and preferably 6 to 14 carbon atoms, such as hexamethylene diamine; 2-methylhexamethylene diamines; tetramethylhexamethylene diamine; 2,5-dimethyl hexamethylene diamine; di(aminopentyl) ether and di(aminopentyl)sulfide. Ring-containing diamines include piperazine, substituted piperazines such as dimethyl piperazine; meta- or para-xylene diamine; 4,6-dimethylxylenediamine; paraphenylene diamine, 4,6-dimethyl paraphenylene diamine; 4,4'-diaminodicyclohexyl propane-2; 1,4-diaminomethylcyclohexane; 1,4-diamino-2,3-dimethyl cyclohexane; 1,4-cyclohexanediamine, and bis(2-sulfo-4 - aminocyclohexyl)methane. Among suitable copolymerizable diacids are alpha-omega aliphatic acids of 2 to 15 carbon atoms; aromatic acids such as terephthalic acid, isophthalic acid, sulfonated isophthalic acid, paraphenylene diacetic acid, bibenzoic acid, 2-methyl terephthalic acid, and 1,4-cyclohexane dicarboxylic acid; 5,5'-thiodivaleric acid; 5,5'-oxydivaleric acid; di(4-carboxycyclohexyl); bis(4-carboxycyclohexyl) methane; and bis(3-methyl-4-carboxycyclohexyl)methane. Typical copolymerizable amino acids (or the corresponding lactams, when these exist) are alpha, omega amino acids of from 2 to 12 carbon atoms between the nitrogen and carbonyl carbon; typical intermediates are pyrrolidone, 6-aminohexanoic acid, ε-caprolactam, 11-aminoundecanoic acid and 12-aminododecanoic acid. Cyclic and/or aromatic amino acids may also be used, such as 4-piperidine carboxylic acid, 4-aminocyclohexaneacetic acid, and 4-amino-4'-carboxybiphenyl, 4-amino-4'-carboxy (dicyclohexyl)methane; 4-aminocyclohexanoic acid; 3-aminocyclohexanoic acid.

Although conventional random copolymers have been described above, the polymers of this invention may also be blended with incompatible or compatible polymers to provide good fibers, for example, having an improved recovery without the usual decrease in melting point which is typical of random copolymers. When the melt blend of compatible polyamides is produced, the product will be a block copolyamide, due to amide interchange.

PROCESSING

The polyamides of this invention are readily prepared using conventional 66 nylon polymerization procedures, except that somewhat higher temperatures are required. As tt content of the diamine is increased, polymer finishing temperature is additionally increased. Surprisingly, the polyamides of this invention are exceedingly stable at spinning temperatures.

The polyamide yarns of this invention are prepared by melt spinning using conventional procedures. In general, the desirable structure is enhanced by a high temperature annealing treatment at constant length. Temperatures of 100 to 200° C. are suitable; usually, the lower temperature range will be preferred for the lower tt isomer content polymers due to their lower heat stability. The yarn may be annealed on the package. This may be accomplished by placing the package in an oven containing an inert gas, air or steam atmosphere. Times of from one minute to one hour are satisfactory, primarily controlled by the time required for all yarn to reach the desired temperature. Preferably, however, the annealing treatment is done on the running yarn, immediately after drawing. Heating is suitably accomplished by yarn contact with a hot plate, pin or tube, or by heating in a radiant tube, fluid jet, molten metal or oil bath, fluidized bed, convection heated oven or the like. Treatment should produce a yarn temperature of at least about 100° C. and preferably 150° C. Under these conditions, yarn contact times of 0.001 to 10 seconds are suitable.

The annealing treatment may be combined with a second stage of drawing, which may be followed with a partial relaxation step if desired. These steps may be performed as separate operations, with packaging steps intervening, or as a continuous sequence.

Alternatively, yarn structure may be improved by relaxing treatments, which may be employed to treat skeins of yarn batchwise, but preferably are carried out on the run immediately following drawing. The heating means disclosed for annealing are suitable for relaxing. Superheated steam or hot air injected into a tube as taught by Pitzl in U.S. Pat. No. 3,003,222 is satisfactory. The amount of relaxation should be controlled, and should be within the range of 5 to 20%.

UTILITY

The polymer of this invention are suitable for casting, molding (compression or extrusion) and thermoforming operations in general. They may be extruded as tubes, rods, bars, bristles, structural shapes, sheet, plates or film. They may be shaped directly from the melt in molds, or may be readily machined to final dimensions. For example, these resins are useful to meet applications requiring toughness, and transparency, along with adequate melting point, solvent sensitivity or brittleness. Still another feature is the insensitivity of mechanical properties to increasing moisture content. Moduli and electrical properties are essentially unchanged and fatigue properties are only slightly changed with increasing moisture levels. These polyamides are useful to make transparent tough film.

Filaments from the higher tt PACM-16 are preferred for wash and wear fabrics, due to greater fiber crystallinity and lower boil-off shrinkage.

Filaments of the polymer of this invention are suitable for use in continuous filament form, as staple, crimped tow, flock or the like. They may be used in fabrics of woven, knitted, tufted, pile, non-woven, or felted construction. They are useful for industrial yarn, especially where high modulus, high recovery fibers are required, such as for V-belts, tire cord, laminates and the like. The filaments may be used alone or may be plied or blended with other natural, synthetic or man-made fiber. The filaments of the invention may be dyed, printed, pigmented, bleached, grafted or the like. They may be textured, bulked, heat set, twisted, crimped, or any combination of these processes. They are suitable as a component in a mixed filament (co-spun) yarn or as component in combined filaments spun in side-by-side or in sheath-core arrangement.

The polymer of this invention may contain suitable heat stabilizers, antioxidants, light stabilizers, ultraviolet light absorbers, delusterants, pigments, dyes, and the like. Other polymer additives may be present to improve dyeability, soil repellence, crease resistance, hand, water repellence, wickability, strength, elongation, modulus, static propensity, or melting point of the fiber.

Many equivalent modifications will be apparent to those skilled in the art from a reading of the above without a departure from the inventive concept.

What is claimed is:
1. A linear fiber-forming polycarbonamide consisting essentially of repeating units of the formula

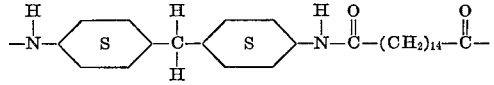

wherein at least 70% by weight of the diamino constituent of the repeating units is of trans-trans stereoisomer configuration.

2. A filament of the polymer of claim 1.

References Cited

UNITED STATES PATENTS

| | | | |
|---|---|---|---|
| 2,512,606 | 6/1950 | Bolton et al. | 260—78 |
| 2,625,536 | 6/1953 | Kirby | 260—78 |
| 3,393,210 | 7/1968 | Speck | 260—78 |
| 3,416,302 | 12/1968 | Knospe | 260—78 |

HAROLD D. ANDERSON, Primary Examiner

U.S. Cl. X.R.

57—140; 161—168, 227